United States Patent
Tsai

(10) Patent No.: US 7,313,410 B2
(45) Date of Patent: Dec. 25, 2007

(54) MOBILE PHONE AND BATTERY-RELEASING DEVICE THEREOF

(75) Inventor: Teng-Yi Tsai, Jhonghe (TW)

(73) Assignee: Benq Corporation, Taoyuan (TW)

( * ) Notice: Subject to any disclaimer, the term of this patent is extended or adjusted under 35 U.S.C. 154(b) by 691 days.

(21) Appl. No.: 10/922,385

(22) Filed: Aug. 20, 2004

(65) Prior Publication Data

US 2005/0048999 A1   Mar. 3, 2005

(30) Foreign Application Priority Data

Sep. 3, 2003   (TW) .............................. 92215914 U

(51) Int. Cl.
*H04M 1/00*   (2006.01)
(52) U.S. Cl. ............... 455/550.1; 455/575.1; 455/572; 455/90.3; 379/433.11; 429/96
(58) Field of Classification Search ............ 455/550.1, 455/575.1, 572, 573, 90.3; 429/96, 100, 429/16; 379/433.08, 433.11, 433.12; 320/107, 320/112–115
See application file for complete search history.

(56) References Cited

U.S. PATENT DOCUMENTS

| | | | |
|---|---|---|---|
| 6,455,188 B1 * | 9/2002 | McKay et al. ................ | 429/97 |
| 6,975,842 B2 * | 12/2005 | Chen .......................... | 455/90.3 |
| 2003/0003949 A1 * | 1/2003 | Park ........................... | 455/550 |
| 2004/0204176 A1 * | 10/2004 | Park ........................... | 455/572 |
| 2005/0070346 A1 * | 3/2005 | Pan ........................... | 455/575.1 |
| 2006/0121956 A1 * | 6/2006 | Lee ............................ | 455/574 |
| 2006/0209177 A1 * | 9/2006 | Kim et al. ................ | 348/14.01 |
| 2006/0226804 A1 * | 10/2006 | Lu ............................. | 320/107 |

* cited by examiner

*Primary Examiner*—Matthew Anderson
*Assistant Examiner*—Sujatha Sharma
(74) *Attorney, Agent, or Firm*—Thomas, Kayden, Horstemeyer & Risley

(57) ABSTRACT

A mobile phone and a battery releasing device. The mobile phone includes a body, a releasing device, and a battery. The releasing device includes a first magnetic member, and is disposed on the body in a manner such that it can move between a first position and a second position. The battery is disposed on the body in a detachable manner, and includes a second magnetic member. The polarization of the second magnetic member is the same as that of the first magnetic member. When the battery is mounted on the body, the first magnetic member is separated from the second magnetic member. When the releasing device is disengaged from the battery, the battery is separated from the body.

13 Claims, 2 Drawing Sheets

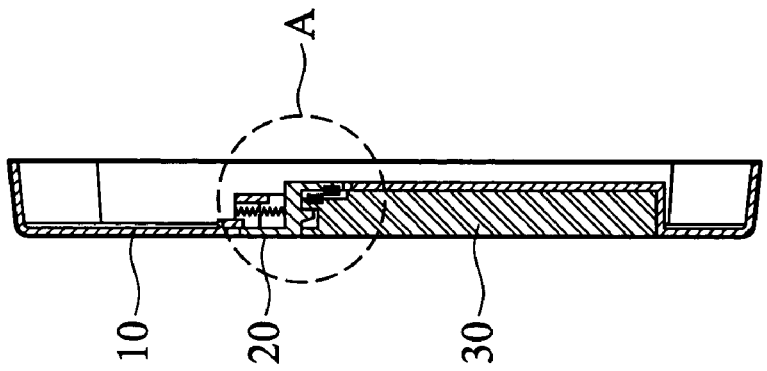
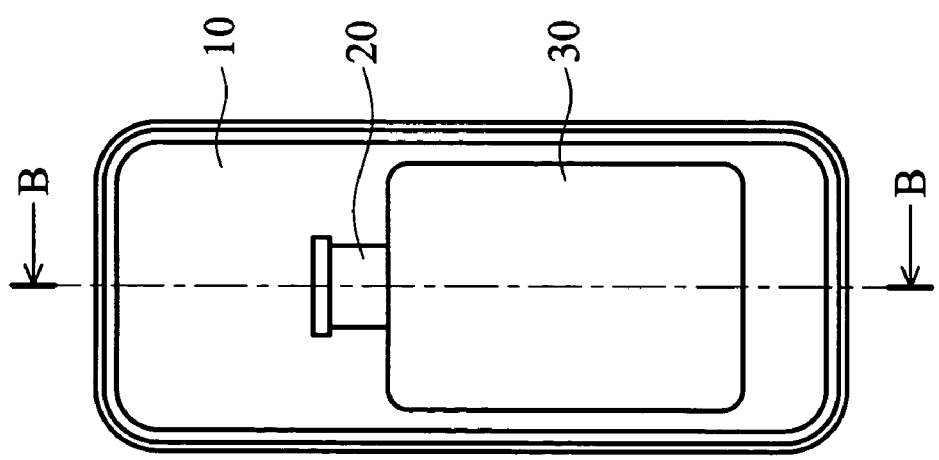
FIG. 1b
FIG. 1a

MOBILE PHONE AND BATTERY-RELEASING DEVICE THEREOF

BACKGROUND OF THE INVENTION

1. Field of the Invention

The invention relates to a mobile phone and a battery-releasing device, and in particular, to a mobile phone with an easily removed battery.

2. Description of the Related Art

In conventional mobile phones, batteries are fixed within the chassis or structure of the phone, normally within the housing, or beneath a dedicated cover. Additionally, to remove the battery, some form of release mechanism is normally employed. Disposition of this mechanism is an important design consideration, and can often compromise appearance and efficient function of the phone.

Specifically, the battery is rejected by means of an elastic member, such as a connector. When a knob is pushed, the battery is slightly lifted, allowing removal.

A disadvantage of the conventional mobile phone is that the size of the battery and the receiving portion on the body must be precisely controlled. Specifically, the gap between the battery and the receiving portion must be very small to maintain integrity of the exterior and prevent the battery sway in the gap. It is complicated to precisely design the gap size to guarantee the close fit of the battery to the mobile phone during manufacture.

SUMMARY OF THE INVENTION

In view of this, the invention provides a mobile phone with an easily removed battery.

Another purpose of the invention is to provide a battery-releasing device that provides effective removal of the battery from an electronic device.

Accordingly, the invention provides a mobile phone comprising a body, a releasing device, and a battery. The releasing device includes a first magnetic member, and is disposed on the body in a manner such that the releasing device moves between a first position and a second position. The battery is disposed on the body in a detachable manner, and comprises a second magnetic member with the same polarization as that of the first magnetic member. When the battery is mounted on the body, the releasing device is in the first position and engaged with the battery. Thus, the first magnetic member is separated from the second magnetic member. When the battery is disengaged from the releasing device, the releasing device is located in the second position and the first magnetic member is near to the second magnetic member. Thus, the battery is separated from the body by way of repulsion force between the first magnetic member and the second magnetic member.

In a preferred embodiment, the releasing device further includes a moving member and an elastic member. The moving member moves between the first position and the second position. The first magnetic member is disposed on the moving member. The elastic member connects the moving member and the body to return the moving member to the first position. The elastic member may be a spring.

In another preferred embodiment, the second magnetic member is closer to the elastic member than the first magnetic member when the moving member is in the first position.

It is understood that the first magnetic member and the second magnetic member may be permanent magnets respectively.

In another preferred embodiment, the battery is formed with a concave portion. Thus, when the releasing device moves to the second position from the first position, the first magnetic member and the second magnetic member do not interfere with each other.

In the invention, a battery-releasing device for an electronic device is provided. The electronic device includes a body and a battery disposed on the body in a detachable manner. The battery-releasing device includes a first magnetic member and a second magnetic member. The first magnetic member is disposed on the body in a manner such that the first magnetic member moves between a first position and a second position. The second magnetic member is disposed on the battery, and has the same polarization as that of the first magnetic member. When the battery is mounted on the body, the first magnetic member is located in the first position so that the first magnetic member is away from the second magnetic member. When the first magnetic member is located in the second position, the first magnetic member is near to the second magnetic member. Thus, the battery is separated from the body by way of repulsion force between the first magnetic member and the second magnetic member.

BRIEF DESCRIPTION OF THE DRAWINGS

The present invention can be more fully understood by reading the subsequent detailed description and examples with references made to the accompanying drawings, wherein:

FIG. 1*a* is a schematic view of a mobile phone as disclosed in the invention;

FIG. 1*b* is a cross section along a line B-B in FIG. 1*a*;

DETAILED DESCRIPTION OF THE INVENTION

FIGS. 1*a*-1*b* show a mobile phone 1 as disclosed in the invention. The mobile phone 1 includes a body 10, a releasing device 20, and a battery 30. The body 10 is a basic component of the mobile phone 1, and includes necessary devices required by the mobile phone 1 therein.

Figure 2A:
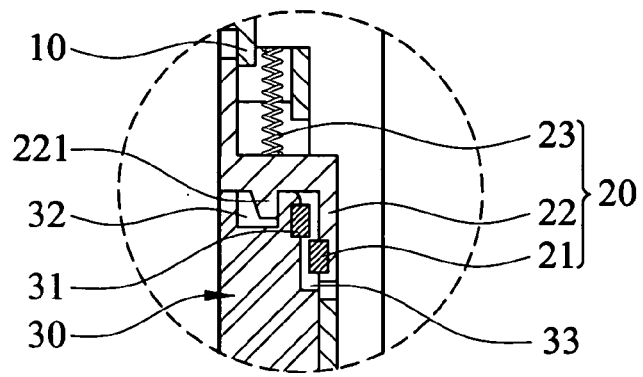
FIG. 2*a* is an enlarged view of a portion A in FIG. 1*b*.
Figure 2B:
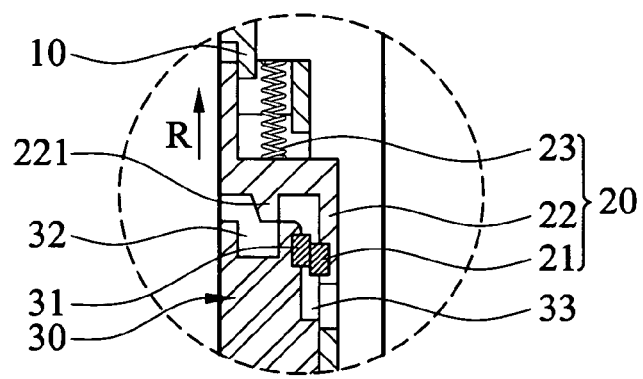
FIG. 2*b* is a schematic view of a releasing device in FIG. 2*a*, wherein the releasing device moves toward a second position.
Figure 2C:
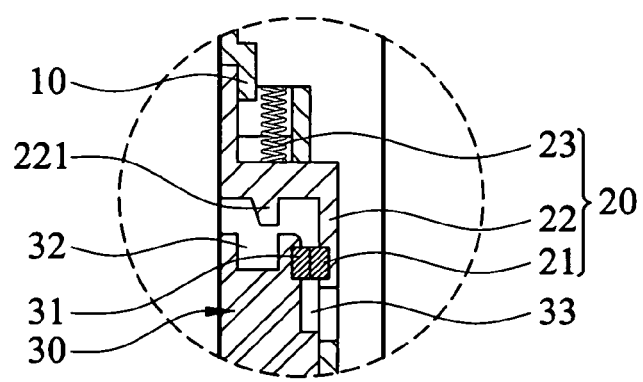
FIG. 2*c* is a schematic view of the releasing device located in the second position.

The releasing device 20 is disposed on the body 10 in a manner such that the releasing device 20 can move between an engaging portion (hereinafter referred to as a first position and as shown in FIG. 2*a*) and a separating position (hereinafter referred to as a second position and as shown in FIG. 2*c*). The releasing device 20 includes a first magnetic member 21, a moving member 22, and an elastic member 23. The first magnetic member 21 is disposed on the moving member .22. The moving member 22 is a main component of the releasing device 20, and can move between the first position and the second position. The moving portion 22 includes a protrusion 221 thereon. The elastic member 23 connects the moving member 22 and the body 10 respectively to return the moving member 22 to the first position.

It is understood that the first magnetic member 21 may be a permanent magnet, and the elastic member 23 may be a spring.

The battery 30 is disposed on the body 10 in a detachable manner, and includes a second magnetic member 31 thereon. The polarization of the second magnetic member 31 is the same as that of the first magnetic member 21. The battery 30 is formed with a first concave portion 33 at a side facing the first magnetic member 21, and is formed with a second concave portion 32 on a side facing the protrusion 221. When the releasing device 20 moves to the second position from the first position, the first magnetic member 21 and the second magnetic member 31 do not interfere with other due to the arrangement of the first concave portion 21.

It is noted that the second magnetic member 31 is closer to the elastic member 23 than the first magnetic member 21 when the moving member 22 is in the first position. Thus, when the battery 30 is inserted into the body 10, the releasing device 20 is moveable to the first position due to repulsion force generated between the second magnetic member 31 and the first magnetic member 21. Additionally, it is understood that the second magnetic member 31 may be a permanent magnet.

Removal of the battery 30 from the body 10 is described as follows. When the battery 30 is seated in the body 10, the releasing device 20 is located in the first position as shown in FIG. 2a. At this time, the first magnetic member 21 is away from the second magnetic member 31, and the protrusion 221 of the moving member 22 of the releasing device 20 is engaged with the second concave portion 32 of the battery 30. The releasing device 20 is then moved in the direction shown by arrow R in FIG. 2b until the releasing device 20 is located in the second position as shown in FIG. 2c. At this time, the first magnetic member 21 is close to and located below the second magnetic member 31, and the protrusion 221 of the moving member 22 of the releasing device 20 is disengaged from the second concave portion 32 of the battery 30. Thus, the battery 30 is separated from the body 10 by way of the repulsion force between the first magnetic member 21 and the second magnetic member 31.

Since the battery is seated in the body in the conventional manner, description thereof is omitted. However, it is noted that the magnetic members requires precise assembly and alignment. Specifically, since the battery may not be assembled with the body due to the repulsion force between the magnetic members, the magnetic members must be arranged as above.

As stated above, the battery can be effectively removed by way of the repulsion force between the magnetic members every time.

Furthermore, since the first magnetic member of the releasing device is maintained in a predetermined position by the elastic member when the battery is not disposed in the body, the releasing device avoids sticking.

Additionally, since the releasing device moves between the first position and the second position, in which the first magnetic member is located below the second magnetic member, during manufacture, the assembly can be accurately preformed without interference from the magnetic forces.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile phone comprising:
    a body;
    a releasing device, including a first magnetic member, disposed on the body in a manner such that the releasing device moves between a first position and a second position; and
    a battery, disposed on the body in a detachable manner, including a second magnetic member having the same polarization as that of the first magnetic member, wherein the releasing device is located in the first position and is engaged with the battery so that the first magnetic member is away from the second magnetic member when the battery is mounted on the body, and the releasing device is located in the second position and the first magnetic member is near to the second magnetic member so that the battery is separated from the body by way of repulsion force between the first magnetic member and the second magnetic member when the battery is disengaged from the releasing device.

2. The mobile phone as claimed in claim 1, wherein the releasing device further comprises:
    a moving member moving between the first position and the second position, wherein the first magnetic member is disposed on the moving member; and
    an elastic member connecting the moving member and the body to return the moving member to the first position.

3. The mobile phone as claimed in claim 2, wherein the elastic member is a spring.

4. The mobile phone as claimed in claim 2, wherein the second magnetic member is closer to the elastic member than the first magnetic member when the moving member is in the first position.

5. The mobile phone as claimed in claim 1, wherein the first magnetic member is a permanent magnet.

6. The mobile phone as claimed in claim 1, wherein the second magnetic member is a permanent magnet.

7. The mobile phone as claimed in claim 1, wherein the battery is formed with a concave portion, such that the first magnetic member and the second magnetic member do not collide when the releasing device moves to the second position from the first position.

8. A battery-releasing device for an electronic device, wherein the electronic device comprises a body and a battery disposed on the body in a detachable manner, and the battery-releasing device comprises:
    a first magnetic member disposed on the body in a manner such that the first magnetic member moves between a first position and a second position; and
    a second magnetic member, disposed on the battery, having the same polarization as that of the first magnetic member, wherein the first magnetic member is located in the first position so that the first magnetic member is away from the second magnetic member when the battery is mounted on the body, and the first magnetic member is near to the second magnetic member so that the battery is separated from the body by way of repulsion force between the first magnetic member and the second magnetic member when the first magnetic member is located in the second position.

9. The device as claimed in claim 8, further comprising:
    a moving member moving between the first position and the second position, wherein the first magnetic member is disposed on the moving member; and
    an elastic member connecting the moving member and the body to return the moving member to the first position.

10. The device as claimed in claim 9, wherein the elastic member is a spring.

11. The device as claimed in claim 9, wherein the second magnetic member is closer to the elastic member than the first magnetic member when the moving member is located in the first position.

12. The device as claimed in claim 8, wherein the first magnetic member is a permanent magnet.

13. The device as claimed in claim 8, wherein the second magnetic member is a permanent magnet.

* * * * *